United States Patent
Ma

(10) Patent No.: US 6,472,463 B1
(45) Date of Patent: Oct. 29, 2002

(54) GRAFT COPOLYMER PIGMENT DISPERSANT

(75) Inventor: Sheau-Hwa Ma, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/466,260

(22) Filed: Dec. 17, 1999

(51) Int. Cl.⁷ .............................................. C08L 51/00
(52) U.S. Cl. ..................... 524/504; 525/176; 525/378
(58) Field of Search ................... 525/378, 176; 524/504

(56) References Cited

U.S. PATENT DOCUMENTS

| | | | |
|---|---|---|---|
| 3,257,340 A | 6/1966 | Osmond | 260/4 |
| 3,580,880 A | 5/1971 | Raymond et al. | 260/29.6 R |
| 3,686,111 A | 8/1972 | Makhlouf et al. | 260/31.2 |
| 3,723,151 A | 3/1973 | Backhouse et al. | 106/308 Q |
| 3,753,760 A | 8/1973 | Kosel | 117/37 LE |
| 3,900,412 A | 8/1975 | Kosel | 252/62.1 |
| 3,990,980 A | 11/1976 | Kosel | 252/62.1 L |
| 4,075,141 A | 2/1978 | Porter, Jr. et al. | 260/17.2 |
| 4,180,489 A | 12/1979 | Andrew et al. | 428/402 |
| 4,206,099 A | 6/1980 | Bentley et al. | 260/22 CB |
| 4,220,679 A | 9/1980 | Backhouse | 427/401 |
| 4,232,135 A | 11/1980 | Bentley et al. | 525/509 |
| 4,294,735 A | 10/1981 | Bentley et al. | 260/22 CB |
| 4,425,450 A | 1/1984 | Horvath | 523/334 |
| 4,656,226 A | 4/1987 | Hutchins et al. | 525/93 |
| 4,722,984 A | 2/1988 | Janowicz | 526/123 |
| 4,755,563 A | 7/1988 | West | 525/287 |
| 4,812,517 A | 3/1989 | West | 525/94 |
| 4,894,399 A | 1/1990 | Rody et al. | 524/91 |
| 5,006,406 A | 4/1991 | Kovacs et al. | 428/323 |
| 5,070,135 A | 12/1991 | Buter | 524/504 |
| 5,085,966 A | 2/1992 | Suzuki et al. | 430/115 |
| 5,274,016 A | 12/1993 | Berner et al. | 524/100 |
| 5,378,762 A | 1/1995 | Czornij et al. | 525/187 |
| 5,424,364 A | 6/1995 | Simms et al. | 525/170 |
| 5,530,070 A | 6/1996 | Antonelli et al. | 525/330.4 |
| 5,721,330 A | 2/1998 | Ma | 526/318.41 |
| 5,753,759 A | 5/1998 | Hartmann et al. | 525/218 |
| 5,770,648 A | 6/1998 | Antonelli et al. | |
| 5,847,028 A | 12/1998 | Iwase et al. | 523/414 |
| 5,852,123 A | 12/1998 | Huybrechts | 525/282 |
| 6,037,414 A | 3/2000 | Simms et al. | |

FOREIGN PATENT DOCUMENTS

| | | |
|---|---|---|
| AU | 707869 | 8/1997 |
| JP | 55089366 | 7/1980 |
| JP | 02211237 | 8/1990 |
| JP | 04198351 | 7/1992 |
| WO | WO94/21701 | 9/1994 |
| WO | WO95/32229 | 11/1995 |
| WO | 97/34934 | 9/1997 |
| WO | WO99/03905 | 1/1999 |

*Primary Examiner*—Peter D. Mulcahy
(74) *Attorney, Agent, or Firm*—Steven C. Benjamin

(57) ABSTRACT

A polymer dispersant for pigments based on an acrylic graft copolymer wherein the graft copolymer has a weight average molecular weight of at least 3000 and has 10 to 90% by weight of a polymeric backbone and 90 to 10% by weight of macromonomer side chains attached to the backbone and wherein the graft copolymer has at least about 1% by weight of a pigment anchoring group selected from the group consisting of an aromatic ester group, aromatic amine group, and quaternary ammonium group, or mixtures thereof, attached to the backbone or the macromonomer. These materials disperse a wide variety of pigments and are useful in solvent borne coatings where they can provide improved efficiency of pigment use, lower paint viscosity, and reduced emission of volatile organic solvent.

16 Claims, No Drawings

GRAFT COPOLYMER PIGMENT DISPERSANT

BACKGROUND OF THE INVENTION

This invention relates to polymeric pigment dispersants, more particularly it relates to graft copolymer pigment dispersants having aromatic ester, aromatic amine, and/or quaternary ammonium groups useful for dispersing a wide variety of pigments.

Polymeric materials have been previously known which are effective for dispersing solid pigments in organic solvents and used to form pigment dispersions of uniform color useful in formulating solvent borne paint compositions. Nowadays, such pigment dispersions are widely used, for example, in exterior solvent borne paints for automobiles and trucks.

Much of the past activity concerning polymeric dispersants has been with random copolymers, but these relatively inefficient materials are being replaced by structured pigment dispersants, such as those having graft copolymer (or comb) structures, as for example, as taught in Huybrechts U.S. Pat. No. 5,852,123 issued Dec. 22, 1998. Such graft copolymers are generally composed of a macromonomer grafted onto a polymer backbone and have attached to either the macromonomer or backbone, a polar group known as a pigment anchoring group which is designed to adsorb on the surface of a pigment particle and thereby anchor the polymer to the pigment surface. While the past work indicates that graft copolymers are outstanding dispersants, they also suffer from certain significant drawbacks. For instance, they are not selectively adsorbed by certain pigment types and are oftentimes displaced from pigment surfaces by polar solvents or other polar groups present in the paint system. Ineffective anchoring of the dispersant to a pigment particle surface is highly undesired, since it allows the pigment particles to flocculate or cluster together and results in pigment dispersions and ultimately paints of poor color quality.

Therefore, there is still a need to improve the performance of such pigment dispersants, and in particular to find new graft copolymers that are more effective in dispersing a wider range of pigments.

SUMMARY OF THE INVENTION

The present invention provides a composition suitable for use as a pigment dispersant, which comprises a graft copolymer, preferably polymerized from all acrylic monomers, having a macromonomer grafted onto a polymeric backbone, wherein the graft copolymer has attached to either the backbone or macromonomer, a pigment anchoring group selected from the group consisting of aromatic esters, aromatic amines, and quaternary ammonium cations, or mixtures thereof. The anchoring groups are preferably attached as pendant groups to the graft copolymer by reaction with functional groups on either the backbone or macromonomer. The graft copolymer may also contain other functional groups, such as hydroxyl groups, in either or both the backbone or macromonomer for crosslinking the dispersant into the final thermoset paint composition.

The polymeric backbone comprises about 10 to 90% by weight, preferably about 20 to 80% by weight, of the graft copolymer and the macromonomer comprises about 90 to 10% by weight, preferably about 80 to 20% by weight, of the graft copolymer. The graft copolymer further contains at least about 1% by weight, preferably about 2 to 30% by weight, based on the total weight of the graft copolymer, of pigment anchoring group, and preferably also contains up to about 30% by weight of hydroxyl groups.

The pigment dispersant is produced by a macromonomer approach which involves grafting a macromonomer (which becomes the side chain of the graft copolymer) onto a polymeric backbone. The macromonomer is polymerized first in the presence of cobalt (II) and cobalt (III) complexes as catalytic chain transfer agents to produce macromonomers having only one terminal ethylenically unsaturated group. The macromonomer is then copolymerized with ethylenically unsaturated backbone monomers, which polymerize to form a backbone polymer with macromonomer side chains grafted thereto. The pigment anchoring group is preferably attached in a subsequent reaction through functional groups built into the backbone or macromonomer.

A non-flocculating pigment dispersion is readily formed by combining the pigment dispersant of this invention with any number of commercially available pigments and an appropriate organic liquid carrier. Such dispersions are useful in solvent borne paints where they impart uniform color to the paint and, at the same time, provide improved efficiency of pigment use, lower paint viscosity, and reduced emission of volatile organic solvents.

DETAILED DESCRIPTION OF THE INVENTION

The pigment dispersant of this invention comprises a graft copolymer preferably produced by a macromonomer approach which involves grafting a macromonomer onto a polymer backbone. The macromonomer which contains only one terminal ethylenically unsaturated group becomes the side chain of the graft copolymer and is prepared first. It is then copolymerized with ethylenically unsaturated monomers chosen for the backbone composition to form the graft structure.

To ensure that the macromonomers only have one terminal ethylenically unsaturated group which will polymerize with the backbone monomers, the macromonomers are most conveniently prepared by a free radical polymerization method wherein the macromonomer is polymerized in the presence of a catalytic cobalt chain transfer agent containing a $Co^{2+}$ group, a $Co^{3+}$ group, or both. Typically, the macromonomer is prepared by polymerizing an acrylic monomer or blend of such monomers, in particular methacrylate based monomers, in the presence of a cobalt chain transfer agent. The macromonomer polymerization is carried out in an organic solvent or solvent blend using conventional polymerization initiators.

Preferred cobalt chain transfer agents that can be used to form the macromonomer are described in U.S. Pat. No. 4,722,984 to Janowicz. Most preferred cobalt chain transfer agents are pentacvano cobaltate (II), diaquabis (borondiflurodimethylglyoximato) cobaltate(II), and diaquabis (borondifluorophenylglyoximato) cobaltate (II). Typically, these chain transfer agents are used at concentrations of about 2–5000 ppm based upon the particular monomers being polymerized and the desired molecular weight. By using such concentrations, macromonomers having a weight average molecular weight (Mw) in the range of about 1,000 to 50,000, preferably about 1,000 to 10,000, can be conveniently prepared.

Typical solvents that can be used to form the macromonomer are alcohols, such as methanol, ethanol, n-propanol, and isopropanol; ketones, such as acetone, butanone, pentanone, hexanone, and methyl ethyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof.

Any of the commonly used azo or peroxy polymerization initiators can be used for preparation of the macromonomer provided it has solubility in the solution of the solvents and the monomer mixture, and has an appropriate half life at the temperature of polymerization. "Appropriate half life" as used herein is a half life of about 10 minutes to 4 hours. Most preferred are azo type initiators such as 2,2'-azobis (isobutyronitrile), 2,2'-azobis (2,4-dimethylvaleronitrile), 2,2'-azobis (methylbutyronitrile), and 1,1'-azobis (cyanocyclohexane). Examples of peroxy based initiators are benzoyl peroxide, lauroyl peroxide, t-butyl peroxypivalate, t-butyl peroctoate which may also be used provided they do not adversely react with the chain transfer agents under the reaction conditions for macromonomers.

The macromonomer contains a single terminal ethylenically unsaturated group, and primarily contains polymerized acrylic monomers and in particular polymerized methacrylic acid or methacrylate monomers. Preferred monomers include methacrylic acid, alkyl methacrylates, cycloaliphatic methacrylates, and aryl methacrylates. Typical alkyl methacrylates that can be used have 1–18 carbon atoms in the alkyl group such as methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, ethoxytriethyleneglycol methacrylate, and the like. Cycloaliphatic methacrylates can be used such as trimethylcyclohexyl methacrylate, t-butyl cyclohexyl methacrylate, cyclohexyl methacrylate, isobornyl methacrylate, and the like. Aryl methacrylates can also be used such as benzyl methacrylate, phenyl methacrylate, and the like.

Other ethylenically unsaturated derivatives can be used for forming the macromonomer such as acrylic acid, alkyl acrylates, cycloaliphatic acrylates, and aryl acrylates. Typical alkyl acrylates have 1–18 carbon atoms in the alkyl group such as methyl acrylate, ethyl acrylate, propyl acrylate, isopropyl acrylate, n-butyl acrylate, isobutyl acrylate, t-butyl acrylate, 2-ethyl hexyl acrylate, nonyl acrylate, lauryl acrylate, 2-(2-ethoxyethoxy)ethyl acrylate, and the like. Cycloaliphatic acrylates can be used such as cyclohexylacrylate, trimethylcyclohexylacrylate, t-butyl cyclohexyl acrylate, and the like. Aryl acrylates such as benzyl acrylate, 2-phenoxyethyl acrylate, and the like. Vinyl aromatics such as styrene, t-butyl styrene, vinyl toluene, and the like, can also be used.

Other more complex methods may also be used to prepare the macromonomers such as making a polymer with a reactive end which is then treated with reagent(s) to create the terminal polymerizable double bond.

After the macromonomer is formed, solvent is optionally stripped off and the backbone monomers are added to the macromonomer along with additional solvent and polymerization initiator, in order to prepare the basic graft copolymer structure by conventional free radical polymerization. The backbone monomers are copolymerized with the macromonomers using any of the conventional azo or peroxide type initiators and organic solvents as described above. The backbone so formed contains polymerized ethylenically unsaturated monomers and any of the monomers listed above for use in the macromonomer may also be used in the backbone. Preferably, the backbone primarily contains polymerized acrylic monomers and in particular primarily polymerized acrylic acid or acrylate monomers, although it may also contain a minor amount (up to about 30% by weight) of polymerized methacrylic acid or methacrylate monomers. Polymerization is generally carried out at or below reflux temperature until a graft copolymer is formed of desired molecular. The graft copolymer useful in the present invention typically has a weight average molecular weight (Mw) of about 3,000 to 100,000, preferably from about 5,000 to 50,000.

The graft copolymer thus formed is composed of a backbone having a plurality of macromonomer side chains or "side arms" attached thereto, which structure is often referred to as a "comb" structure. The pigment anchoring groups employed in this invention are attached as pendant groups to the graft copolymer preferably by reaction with functional groups on either the backbone or the macromonomer arms. As used herein, a "regular" graft copolymer refers to a graft copolymer with pigment anchoring groups on the backbone, whereas a "reverse" graft copolymer refers to a graft copolymer having pigment anchoring groups concentrated on the macromonomer arms. Either of these configurations can be formed in this invention.

Functional groups that are built in the graft copolymer structure will vary depending on the particular pigment anchoring group employed. The functional groups can be placed on the backbone or macromonomer through the use of suitable functional ethylenically unsaturated monomers, preferably acrylic monomers, which introduce appropriate functional groups to the desired segment during its polymerization. In the present invention, epoxy functional monomers are preferred for the formation of the aromatic ester and aromatic amine anchoring groups via epoxy/acid and epoxy/amine reactions, and amine functional monomers are used for creation of the quaternary ammonium anchoring groups.

As mentioned above, the pigment anchoring group can be, and preferably is, attached to the graft copolymer by subsequently reacting the functional groups built into the backbone or the macromonomer with a suitable anchoring group precursor compound that will react with the functional groups to form the desired anchoring group on the graft copolymer structure. The pigment anchoring group can also be attached by adding ethylenically unsaturated monomers containing the appropriate anchoring groups during the polymerization of the macromonomer or backbone. The pigment anchoring groups useful in the present invention include:

(1) aromatic ester groups, (2) aromatic amine groups, (3) cationic quaternary ammonium groups, or (4) any mixtures thereof.

As indicated above, concentration of the pigment anchoring group in the graft copolymer should be at least about 1% by weight, based on the total weight of the graft copolymer. At lower concentrations, there may not be sufficient interaction with the pigment to avoid flocculation, particularly in more polar solvents. The preferred concentration is between about 2 and 30% by weight. However, at higher concentrations, generally above 20% by weight, low polarity solvents may not be satisfactory solvents for the dispersants.

The aromatic ester anchoring groups, in particular, can be, and preferably are, attached as pendant groups to the basic graft copolymer by reacting epoxy functional groups built into the backbone or the macromonomer with an aromatic carboxylic acid. The reaction conditions should be chosen so that 100% of the epoxy groups are reacted (i.e., esterified), or as close to 100% as can be reasonably achieved, leaving essentially no unreacted epoxy groups in the dispersant molecule which can have negative effects on dispersant performance. A catalytic amount of a tertiary amine or a quaternary ammonium salt can be advantageously used to accelerate the reaction and drive it to completion. A useful example is benzyltrimethyl ammonium hydroxide. The synthesis of copolymers in which one of the segments produced contains epoxy functional groups is well known. For example, the epoxy functional group may be obtained through polymerization of epoxy functional ethylenically unsaturated monomers. Acrylic monomers are generally preferred, and in particular epoxy functional acrylate and methacrylate monomers, such as glycidyl methacrylate. The aromatic carboxylic acids useful herein may be unsubstituted or may contain substituents, such as, e.g., nitro groups, hydroxy, amino, ester, acryloxy, amide, nitrile, halogen, haloalkyl, alkoxy, and the like. Preferred aromatic carboxylic acids are benzoic acid, 2-nitrobenzoic acid, 3-nitrobenzoic acid, 4-nitrobenzoic acid, 3,5-dinitrobenzoic acid, 1-naphthoic acid, 3-chlorobenzoic acid, 4-biphenyl carboxylic acid, n-phthaloyl glycine, 4-sulfamido benzoic acid, and the like.

The aromatic amine anchoring groups can be, and preferably are, added to the basic graft copolymer by reacting epoxy functional groups provided on the backbone or macromonomer with a secondary aromatic amine. Again, the reaction conditions should be chosen so that substantially all of the epoxy groups are reacted. The epoxy groups can be placed on the graft copolymer by the method described above. The epoxy groups are then reacted in a subsequent reaction with the secondary aromatic amine precursor compounds to form a graft copolymer having pendant tertiary aromatic amine functionality. The secondary aromatic amines useful in this invention may be unsubstituted or may contain substituents such as, e.g., hydroxy, ester, acyloxy, amide, nitrile, halogen, haloalkyl, alkoxy, and the like. Preferred secondary aromatic amines include N-benzyl methylamine, N-benzylethanolamine, N,N-dibenzylamine, 2-(2-methylaminoethyl)pyridine, 1-phenylpiperazine. 1-benzyl piperazine, 3-(3-pyridylmethylamines) propionitrile, and the like. Alternatively, the pendant aromatic amine groups may be introduced to the graft copolymer by using instead a precursor compound containing both a tertiary aromatic amine and a carboxylic acid functional group in the esterification reaction described above. Useful examples of such compounds include nicotinic icid, picolinic acid, isonicotinic acid, indole-3-acetic acid, and the like. Alternatively, aromatic amine containing monomers, such as 4-aminostyrene, 2-vinyl pyridine, 4-vinyl pyridine, and the like, may be directly copolymerized into the graft copolymer to form the aromatic amine anchoring groups, if desired.

The graft copolymer of this invention may also contain pendant cationic quaternary ammonium groups as the pigment anchoring group. These anchoring groups can be, and preferably are, attached to the graft copolymer by contacting tertiary amine functional groups built into the backbone or the macromonomer with an alkylation agent. Total alkylation should be at least about 30% of the tertiary amine moieties, preferably at least about 50%. The synthesis of copolymers in which one of the segments produced contains tertiary amine functionality is well known. For example, the tertiary amine functionality can be obtained by the above methods or preferably by direct polymerization of ethylenically unsaturated monomers which contain pendant tertiary amine groups. Acrylic monomers are generally preferred. Preferred monomers include N,N-dimethylaminoethyl acrylate, N,N-dimethylaminoethyl methacrylate, N,N-diethylaminoethyl acrylate, N,N-diethylaminoethyl methacrylate, N-t-butylaminoethyl methacrylate, 2-N-morpholinoethyl acrylate, 2-N-morpholinoethyl methacrylate, and the like. Vinyl monomers can also be used, such as 4-aminostyrene, 2-vinyl pyridine, 4-vinyl pyridine, and the like. These cationic precursor units are preferably converted to the quaternary state after the formation of the basic copolymer structure by bringing the cationic precursor unit into contact with conventional alkylation agents, such as aralkyl halides, alkyl halides, alkyl toluene sulfonate, or trialkyl phosphates halides. Alkylation agents which have been found to be particularly satisfactory include, benzyl chloride, methyl toluene sulfonate, and dimethyl sulfate.

Other possibilities for attaching the forgoing pigment anchoring groups to the graft copolymer will be apparent to persons skilled in the art.

In addition to the anchoring groups above, the graft copolymer may also, and preferably does, contain other polar functional groups, such as hydroxyl groups, capable of reacting with film forming binder components in the paint composition to crosslink the dispersant into the binder matrix and become a permanent part of the paint film. This enhances film adhesion, improves the overall mechanical properties of the paint in general, and prevents deterioration or delamination of the film upon aging, as may occur if the dispersant remained an unreacted component. The hydroxyl groups may be placed in the backbone or in the macromonomer arms, or both. The preferred location is in the segment with the pigment anchoring groups. While a wide variety of ethylenically unsaturated monomers can be used which introduce appropriate pendant hydroxyl groups to the desired segment during its polymerization, acrylic monomers and in particular hydroxy functional acrylate and methacrylate monomers are preferred. Hydroxy functional methacrylates that can be used include 2-hydroxyethyl methacrylate, 3-hydroxypropyl methacrylate, 4-hydroxylbutyl methacrylate, and the like. Hydroxyl acrylates can also be used such as 2-hydroxyethyl acrylate, 3-hydroxypropyl acrylate, 4-hydroxybutyl acrylate, and the like. The hydroxyl groups are preferably provided in a concentration of up to 30% by weight, of the graft copolymer. This generally translates to a hydroxyl value of about 10 to 150.

Table I summarizes the various pigment anchoring groups and possible locations on the graft copolymer.

TABLE I

| Copolymer | Functionality | Location |
| --- | --- | --- |
| 1 | quaternary ammonium + amine | backbone |
| 2 | quaternary ammonium | backbone |
| 3 | amine | backbone |
| 4 | ester | backbone |
| 5 | ester + amine | backbone |
| 6 | ester + quaternary ammonium | backbone |
| 7 | ester + amine + quaternary ammonium | backbone |
| 8 | quaternary ammonium + amine | macromonomer |
| 9 | quaternary ammonium | macromonomer |
| 10 | amine | macromonomer |
| 11 | ester | macromonomer |
| 12 | ester + amine | macromonomer |

TABLE I-continued

| Copolymer | Functionality | Location |
|---|---|---|
| 13 | ester + quaternary ammonium | macromonomer |
| 14 | ester + amine + quaternary ammomum | macromonomer |

While not wishing to be bound by any particular theory, these graft polymers when used as pigment dispersants are thought to work by anchoring onto and forming a layer of polymer surrounding the pigment particle, which layer extends into the surrounding solvent medium to provide steric stabilization of the pigment particles. The pigment particles then do not come close enough to one another to flocculate, unless there is insufficient interaction between the dispersant polymer and the pigment surfaces. The pigment anchoring groups employed herein have been found to interact effectively with a much wider range of pigments, which enables the graft copolymers of the present invention to be selectively adsorbed by a wider range of pigments and not be displaced from pigment surfaces by polar solvents or other polar functional groups present in the paint system which could compete for adsorption on the pigment surfaces. Stable and non-flocculating dispersions can thus easily be formed.

Such graft copolymers can be used to form a pigment dispersion or a millbase. Pigments are added to the graft copolymer in the customary organic solvent or blend and are dispersed using conventional techniques such as high speed mixing, ball milling, sand grinding, attritor guiding, or two or three roll milling. The resulting pigment dispersion has a pigment to dispersant binder weight ratio of about 0.1/100 to 2000/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phtalocyanines, perylenes, azo pigment, and indanthrones carbazoles such as carbazole violet, isoindolinones, isoindolons, thioindigio reds, and benzimidazolinones; and metallic flakes such as aluminum flake, pearlescent flakes, and the like.

It may be desirable to add other optical ingredients to the pigment dispersion such as antioxidants, flow control agents, UV stabilizers, light quenchers and absorbers, and rheology control agents such as fumed silica and microgels. Other film forming polymers can also be added such as acrylics, acrylourethanes, polyester urethanes, polyesters, alkyds, polyethers and the like.

Pigment dispersions of this invention can be added to a variety of solvent borne coating or paint compositions such as primers, primer surfacers, topcoats which may be monocoats, or basecoats of a clearcoat/basecoat finish. These compositions may contain film-forming polymers such as hydroxy functional acrylic and polyester resins and crosslinking agents such as blocked isocyanates, alkylated melamines, polyisocyanates, epoxy resins, and the like. Preferably, the graft copolymer contains functional groups that will become part of the final network structure by reacting with the crosslinkers.

The following examples illustrate the invention. All parts and percentages are on a weight basis unless otherwise indicated. All molecular weights are determined by gel permeation chromatography (GPC) using a polymethyl methacrylate standard. Mn represents number average molecular weight and Mw represents weight average molecular weight. All viscosity measurements are reported using a Gardner Holtz scale.

EXAMPLES

Example 1

Preparation of BMA/MMA Macromonomer, 50/50% by Weight

This example illustrates the preparation of a macromonomer that can be used to form a graft copolymer of this invention. A 12-liter flask was equipped with a thermometer, stirrer, additional funnels, heating mantle, reflux condenser and a means of maintaining a nitrogen blanket over the reactants. The flask was held under nitrogen positive pressure and the following ingredients were employed.

|  | Weight (gram) |
|---|---|
| Portion 1 | |
| methyl ethyl ketone | 1320 |
| methyl methacrylate (MMA) | 518.4 |
| butyl methacrylate (BMA) | 518.4 |
| Portion 2 | |
| diaquabis(borondifluorodiphenyl glyoximato) cobaltate (II), Co(DPG-BF$_2$) | 0.0622 |
| methyl ethyl ketone | 167.9 |
| Portion 3 | |
| 2,2'-azobis(methylbutyronitrile) (Vazo ® 67 by DuPont Co., Wilmington, DE) | 8.49 |
| methyl ethyl ketone | 110 |
| Portion 4 | |
| methyl methacrylate (MMA) | 2073.6 |
| butyl methacrylate (BMA) | 2073.6 |
| Portion 5 | |
| 2,2'-azobis(methylbutyronitrile) (Vazo ® 67 by DuPont Co., Wilmington, DE) | 84.9 |
| methyl ethyl ketone | 1100 |
| Total | 7975.352 |

Portion 1 mixture was charged to the flask and the mixture was heated to reflux temperature and refluxed for about 20 minutes. Portion 2 solution was then added to the flask over a 5 minute period and the reaction mixture was refluxed for 10 minutes. Portion 3 was then added over 5 minutes while the reaction mixture was held at reflux temperature. Portion 4 and Portion 5 were then simultaneously fed to the reactor over 240 minutes while the reaction mixture was held at reflux temperature throughout the course of additions. Reflux was continued for another 2 hours and the solution was cooled to room temperature and filled out. The resulting macromonomer solution was a light yellow clear polymer solution and had a solid content of about 63.9%. The macromonomer had a 7,037 Mw and 3,986 Mn.

Example 2
Preparation of EHMA/MMA Macromonomer, 60/40 % by Weight

The procedure of Example 1 was repeated with the following ingredients.

|  | Weight (gram) |
|---|---|
| Portion 1 | |
| methyl ethyl ketone | 1320 |
| 2-ethylhexyl methacrylate (BHMA) | 414.7 |
| methyl methacrylate (MMA) | 622.1 |
| Portion 2 | |
| diaquabis(borondifluorodiphenyl glyoximato) cobaltate (II), Co(DPG-BF$_2$) | 0.0778 |
| methyl ethyl ketone | 167.9 |
| Portion 3 | |
| 2,2'-azobis(methylbutyronitrile) (Vazo ® 67 by DuPont Co., Wilmington, DE) | 8.49 |
| methyl ethyl ketone | 110 |
| Portion 4 | |
| methyl methacrylate (MMA) | 1658.9 |
| 2-ethyl hexyl methacrylate (EHMA) | 2488.3 |
| Portion 5 | |
| 2,2'-azobis(methylbutyronitrile) (Vazo ® 67 by DuPont Co., Wilmington, DE) | 84.9 |
| methyl ethyl ketone | 1100 |
| Total | 7975.368 |

The resulting macromonomer solution was a light yellow clear polymer solution and had a solid content of about 64%. The macromonomer had a 8,379 Mw and 4,661 Mn.

Example 3
Preparation of GMA Macromonomer

The procedure of Example 1 was repeated in a 5-liter flask with the following ingredients.

|  | Weight (gram) |
|---|---|
| Portion 1 | |
| methyl ethyl ketone | 837.0 |
| glycidyl methacrylate (GMA) | 432.0 |
| Portion 2 | |
| diaquabis(borondifluorodiphenyl glyoximato) cobaltate (II), Co(DPG-BF$_2$) | 0.108 |
| methyl ethyl ketone | 60.0 |
| Portion 3 | |
| 2,2'-azobis(2,4-dimethylvaleronitrile) (Vazo ® 52 by DuPont Co., Wilmington, DE) | 2.0 |
| methyl ethyl ketone | 60.0 |
| Portion 4 | |
| glycidyl methacrylate (GMA) | 1728.0 |
| Portion 5 | |
| 2,2'-azobis(2,4-dimethylvaleronitrile) (Vazo ® 52 by DuPont Co., Wilmington, DE) | 30.0 |
| methyl ethyl ketone | 450.0 |
| Total | 3600.108 |

The resulting macromonomer solution was a light yellow clear polymer solution and had a solid content of about 56.2%. The macromonomer had a 4,813 Mw and 2,705 Mn.

Example 4
Preparation of BMA/MMA/ETEGMA Macromonomer 40/40/20 % by Weight

The procedure of Example 1 was repeated in a 5-liter flask with the following ingredients.

|  | Weight (gram) |
|---|---|
| Portion 1 | |
| methyl ethyl ketone | 838.0 |
| butyl methacrylate (BMA) | 172.8 |
| methyl methacrylate (MMA) | 172.8 |
| ethoxytriethyleneglycol methacrylate (ETEGMA) | 86.4 |
| Portion 2 | |
| diaquabis(borondifluorodiphenyl glyoximato) cobaltate (II), Co(DPG-BF$_2$) | 0.0864 |
| methyl ethyl ketone | 60.0 |
| Portion 3 | |
| 2,2'-azobis(2,4-dimethylvaleronitrile) (Vazo ® 52 by DuPont Co., Wilmington, DE) | 2.0 |
| methyl ethyl ketone | 60.0 |
| Portion 4 | |
| butyl methacrylate (BMA) | 691.2 |
| methyl methacrylate (MMA) | 691.2 |
| ethoxytriethyleneglycol methacrylate (ETEGMA) | 345.6 |
| Portion 5 | |
| 2,2'-azobis(2,4-dimethylvaleronitrile) (Vazo ® 52 by DuPont Co., Wilmington, DE) | 30.0 |
| methyl ethyl ketone | 450.0 |
| Total | 3600.0864 |

The resulting macromonomer solution was a light yellow clear polymer solution and had a solid content of about 53.2%. The macromonomer had a 5,550 Mw and 2,883 Mn.

Example 5
Preparation of GMA Macromonomer

The procedure of Example 1 was repeated in a 5-liter flask with the following ingredients.

|  | Weight (gram) |
|---|---|
| Portion 1 | |
| methyl ethyl ketone | 838.0 |
| glycidyl methacrylate (GMA) | 432.0 |
| Portion 2 | |
| diaquabis(borondifluorodiphenyl glyoximato) cobaltate (II), Co(DPG-BF$_2$) | 0.216 |
| methyl ethyl ketone | 60.0 |
| Portion 3 | |
| 2,2'-azobis(2,4-dimethylvaleronitrile) (Vazo ® 52 by DuPont Co., Wilmington, DE) | 2.0 |
| methyl ethyl ketone | 60.0 |
| Portion 4 | |
| glycidyl methacrylate (GMA) | 1728.0 |
| Portion 5 | |
| 2,2'-azobis(2,4-dimethylvaleronitrile) (Vazo ® 52 by DuPont Co., Wilmington, DE) | 30.0 |
| methyl ethyl ketone | 450.0 |
| Total | 3600.216 |

The resulting macromonomer solution was a light yellow clear polymer solution and had a solid content of about 56.2%. The macromonomer had a 2,969 Mw and 828 Mn

Example 6
Preparation of a Regular Graft Copolymer with Amine and Quaternized Ammonium Group This example shows the preparation of a graft copolymer of this invention containing amine and quaternized ammonium groups, specifically methyl acrylate-co-2-hydroxyethyl acrylate-co-N,N-dimethylaminoethyl acrylate (benzyl chloride)-g-butyl methacrylate-co-methyl methacrylate, 12.7/7.8/3.9(2.6)//36.5/36.5% by weight, from a macromonomer prepared above.

A 2-liter flask was equipped as in Example 1. The flask was held under nitrogen positive pressure and the following ingredients were employed.

|  | Weight (gram) |
|---|---|
| Portion 1 | |
| macromonomer of Example 1 | 830.8 |
| ethyl acetate | 10.0 |
| Portion 2 | |
| methyl acrylate | 93.6 |
| N,N-dimethylaminoethyl acrylate | 28.8 |
| 2-hydroxyethyl acrylate | 57.6 |
| Portion 3 | |
| t-butyl peroctoate (Elf Atochem North America, Inc., Philadelphia, PA) | 9.0 |
| ethyl acetate | 90.0 |
| Portion 4 | |
| benzyl chloride (Aldrich Chemical Co., Milwaukee, WI) | 19.1 |
| propyleneglycol monomethyl ether acetate | 503.5 |
| Total | 1642.5 |

Portion 1 mixture was charged to the flask and the mixture was heated to reflux temperature and refluxed for about 10 minutes. Portion 2 and 3 were simultaneously added over 3 hours while the reaction mixture was held at reflux temperature. The reaction mixture was refluxed for another 1.5 hours. Portion 4 solution was added. The reaction mixture was refluxed for 3 hours. After cooling the polymer solution was filled out to yield a 45.2% polymer solution. This graft copolymer contains a copolymer of methyl acrylate, 2-hydroxyethyl acrylate, and N,N-dimethylaminoethyl acrylate (75% quaternized with benzyl chloride) in the backbone and a random copolymer butyl melhacrylate and methyl methacrylate in the arms. The graft copolymer had a Gardner-Holtz viscosity of M.

Example 7
Preparation of a Regular Graft Copolymer with Aromatic Ester Group This shows the preparation of a graft copolymer of this invention containing p-nitrobenzoate groups, specifically methyl acrylate-co-2-hydroxyethyl acrylate-co-glycidyl methacrylate (p-nitrobenzoic acid)-g-2-ethylhexyl methacrylate-co-methyl methacrylate, 11.4/10.5(12.4)/4.4// 36.8/24.5% by weight, from a macromonomer prepared above and the following ingredients.

|  | Weight (gram) |
|---|---|
| Portion 1 | |
| macromonomer of Example 2 | 689.3 |
| ethyl acetate | 28.0 |
| Portion 2 | |
| methyl acrylate | 83.2 |
| glycidyl methacrylate | 76.8 |
| 2-hydroxyethyl acrylate | 32.0 |
| Portion 3 | |
| t-butyl peroctoate (Elf Atochem North America, Inc., Philadelphia, PA) | 8.0 |
| ethyl acetate | 100.0 |
| Portion 4 | |
| p-nitrobenzoic acid (Aldrich Chemical Co., Milwaukee, WI) | 92.1 |
| propylene carbonate | 207.1 |
| benzyltrimethyl ammonium hydroxide (40% in methanol, Aldrich Chemical Co., Milwaukee, WI) | 11.3 |
| Total | 1327.8 |

Portion 1 mixture was charged into a 2-liter flask equipped as in Example 1 and the mixture was heated to reflux temperature and refluxed for about 10 minutes. Portion 2 and 3 were simultaneously added over 3 hours while the reaction mixture was held at reflux temperature. The reaction mixture was refluxed for another hour. Portion 4 was added. The reaction mixture was refluxed for 4 hours. After cooling the polymer solution was filled out to yield a 57.2% polymer solution. This graft copolymer contains a copolymer of methyl acrylate, 2-hydroxyethyl acrylate, and glycidyl methacrylate (100% esterified with p-nitrobenzoic acid) in the backbone and a random copolymer 2-ethylhexyl methacrylate and methyl methacrylate in the arms. The graft copolymer had a 63,672 Mw and 13,582 Mn and a Gardner-Holtz viscosity of Z-4.

Example 8
Preparation of a Reverse Graft Copolymer with Aromatic Ester Group This shows the preparation of a reverse graft copolymer of this invention containing p-nitrobenzoate groups, specifically butyl acrylate-co-methyl methacrylate-g-glycidyl methacrylate (p-nitrobenzoic acid), 36.4/28.3//16.2(19.0)% by weight, from a macromonomer prepared above and the following ingredients.

|  | Weight (gram) |
|---|---|
| Portion 1 | |
| macromonomer of Example 3 | 1200.2 |
| methyl ethyl ketone | 405 |
| Portion 2 | |
| t-butyl peroxypivalate (Lupersol ® 11, 75% in paraffin, Elf Atochem North America, Inc., Philadelphia, PA) | 10.8 |
| methyl ethyl ketone | 135.0 |
| Portion 3 | 1620.0 |
| butyl acrylate | |
| methyl methacrylate | 1260.0 |

-continued

| | Weight (gram) |
|---|---|
| Portion 4 | |
| t-butyl peroxypivalate (Lupersol ® 11, 75% in paraffin, Elf Atochem North America, Inc., Philadelphia, PA) | 81.0 |
| methyl ethyl ketone | 810.0 |
| Portion 5 | |
| t-butyl peroxypivalate (Lupersol ® 11, 75% in paraffin, Elf Atochem North America, Inc., Philadelphia, PA) | 10.8 |
| methyl ethyl ketone | 135.0 |
| Portion 6 | |
| p-nitrobenzoic acid (Aldrich Chemical Co., Milwaukee, WI) | 888.8 |
| benzyltrimethylammonium hydroxide (40% in methanol, Aldrich Chemical Co., Milwaukee, WI) | 90.0 |
| propyleneglycol monomethyl ether acetate | 2622.8 |
| Portion 7 | |
| propyleneglycol monomethyl ether acetate | 1200.0 |
| Total | 10469.4 |

The Portion 1 mixture was charged into a 12-liter flask equipped as in Example 1 and heated to reflux temperature and refluxed for about 10 minutes. Portion 2 was added over 5 minutes. Portions 3 and 4 were then simultaneously fed into the reactor over 3 hours while the reaction mixture was held at reflux temperature. The reaction mixture was refluxed for another hour. Portion 5 solution was added over 5 minutes. The reaction mixture was refluxed for another 2 hours. Portion 6 was added, and about 1600 gm of solvent was distilled off while the reaction temperature was gradually raised to 120° C. The reaction mixture was then refluxed for 4 hours. After cooling the polymer solution was filled out to yield a 51% polymer solution. This graft copolymer contains a random copolymer of butyl acrylate and methyl methacrylate in the backbone and a homopolymer of glycidyl methacrylate (100% esterified with p-nitrobenzoic acid) in the arms. The graft copolymer had a 40,890 Mw and 12,510 Mn and Gardner-Holtz viscosity of Z-2.

Example 9
Preparation of a Regular Graft Copolymer with Aromatic Amine Group

This shows the preparation of a graft copolymer of this invention containing aromatic amine groups, specifically 2-phenoxyethyl acrylate-co-glycidyl methacrylate (N-benzylmethyl amine)-g-butyl methacrylate-co-methyl methacrylate-co-ethoxytriethyleneglycol methacrylate 31.8/23.9(20.4)//9.6/9.6/4.8% by weight, from a macromonomer prepared above and the following ingredients.

| | Weight (gram) |
|---|---|
| Portion 1 | |
| macromonomer of Example 4 | 400.0 |
| methyl ethyl ketone | 100.0 |
| Portion 2 | |
| t-butyl peroxypivalate (Lupersol ® 11, 75% in paraffin, Elf Atochem North America, Inc., Philadelphia, PA) | 2.0 |
| methyl ethyl ketone | 40.0 |

-continued

| | Weight (gram) |
|---|---|
| Portion 3 | |
| 2-phenoxyethyl acrylate | 320.0 |
| glycidyl methacrylate | 240.0 |
| Portion 4 | |
| t-butyl peroxypivalate (Lupersol ® 11, 75% in paraffin, Elf Atochem North America, Inc., Philadelphia, PA) | 16.0 |
| methyl ethyl ketone | 160.0 |
| Portion 5 | |
| t-butyl peroxypivalate (Lupersol ® 11, 75% in paraffin, Elf Atochem North America, Inc., Philadelphia, PA) | 2.0 |
| methyl ethyl ketone | 40.0 |
| Portion 6 | |
| N-benzylmethyl amine (Aldrich Chemical Co., Milwaukee, WI) | 26.8 |
| Total | 1320.0 |

Portion 1 mixture was charged in a 5-liter flask equipped as in Example 1. The mixture was heated to reflux temperature and refluxed for about 10 minutes. The Portion 2 was added over 5 minutes. Portions 3 and 4 were then simultaneously fed into the reactor over 3 hours while the reaction mixture was held at reflux temperature. The reaction mixture was refluxed for another hour. Portion 5 solution was added over 5 minutes. The reaction mixture was refluxed for another 2 hours. After cooling the polymer solution was filled out to yield a 56.2% polymer solution. This graft copolymer contains a random copolymer of 2-phenoxyethyl acrylate and glycidyl methacrylate in the backbone and a copolymer of butyl methacrylate, methyl methacrylate, and ethoxytriethyleneglycol methacrylate in the arms. The graft copolymer had a 34,860 Mw and 8,521 Mn and a Gardner-Holtz viscosity of T.

100 gm of the above polymer solution was charged into a 500 mL flask equipped with a thermometer, stirrer, reflux condenser and a means of maintaining nitrogen blanket over the reaction mixture. Portion 6 was added and the reaction mixture was heated to reflux temperature and refluxed for 3 hours. After cooling the polymer solution was filled out to yield a light yellow clear 62.8% polymer solution. The amine had reacted with the epoxide group on glycidyl methacrylate to provide the aromatic amine groups on the polymer. The polymer solution had a Gardener-Holtz viscosity of Z-2.

Example 10
Preparation of a Reverse Graft Copolymer with Aromatic Amine Group

This shows the preparation of a reverse graft copolymer of this invention containing aromatic amine groups, specifically butyl acrylate-co-methyl methacrylate-co-2-(2-ethoxyethoxy)ethyl acrylate-g-glycidyl methacrylate (N-benzylmethyl amine) 23.9/15.9/15.9//23.9(20.9) % by weight, from a macromonomer prepared above and the following ingredients.

| | Weight (gram) |
|---|---|
| Portion 1 | |
| macromonomer of Example 5 | 1080.0 |
| methyl ethyl ketone | 106.8 |

|  | Weight (gram) |
|---|---|
| Portion 2 | |
| t-butyl peroxypivalate (Lupersol ® 11, 75% in paraffin, Elf Atochem North America, Inc., Philadelphia, PA) | 6.68 |
| methyl ethyl ketone | 80.0 |
| Portion 3 | |
| butyl acrylate | 640.8 |
| methyl methacrylate | 427.2 |
| 2-(2-ethoxyethoxy)ethyl acrylate) | 427.2 |
| Portion 4 | |
| t-butyl peroxypivalate (Lupersol ® 11, 75% in paraffin, Elf Atochem North America, Inc., Philadelphia, PA) | 26.7 |
| methyl ethyl ketone | 427.2 |
| Portion 5 | |
| t-butyl peroxypivalate (Lupersol ® 11, 75% in paraffin, Elf Atochem North America, Inc., Philadelphia, PA) | 6.68 |
| methyl ethyl ketone | 80.0 |
| Portion 6 | |
| N-benzylmethyl amine (Aldrich Chemical Co., Milwaukee, WI) | 581.77 |
| Total | 3891.03 |

Portion 1 mixture was charged in a 5-liter flask equipped as in Example 1. The mixture was heated to reflux temperature and refluxed for about 10 minutes. Portion 2 was added over 5 minutes. Portions 3 and 4 were then simultaneously fed into the reactor over 3 hours while the reaction mixture was held at reflux temperature. The reaction mixture was refluxed for another hour. Portion 5 solution was added over 5 minutes. The reaction mixture was refluxed for another 2 hours. After cooling, a polymer sample was collected. Portion 6 was added and the reaction mixture was refluxed for 3 hours under nitrogen blanket. After cooling, the polymer solution was filled out to yield a 62.2% polymer solution. This graft copolymer contains a random copolymer of butyl acrylate, methyl methacrylate, and 2-(2-ethoxyethoxy)ethyl acrylate in the backbone, and glycidyl methacrylate (reacted with N-benzylmethyl amine) in the arms. The graft copolymer, before the reaction with the amine had a 20,850 Mw and 6,450 Mn and a Gardner-Holtz viscosity of G. The final polymer had a Gardener-Holtz viscosity of U.

Example 11
Preparation of a Regular Graft Copolymer with Aromatic Ester and Aromatic Amine Groups This shows the preparation of a graft copolymer of this invention containing both p-nitrobenzoate and N-benzylmethyl amine groups, specifically methyl acrylate-co-2-hydroxyethyl acrylate-co-glycidyl methacrylate (p-nitrobenzoic acid/N-benzylmethyl amine)-g-ethylhexyl methacrylate-co-methyl methacrylate, 8.8/7.0/10.6 (11.4/0.75)//36.9/24.6% by weight from a macromonomer prepared above and the following ingredients.

|  | Weight (gram) |
|---|---|
| Portion 1 | |
| macromonomer of Example 2 | 689.3 |
| ethyl acetate | 25.0 |
| Portion 2 | |
| methyl acrylate | 64.0 |
| glycidyl methacrylate | 76.8 |
| 2-hydroxyethyl acrylate | 51.2 |
| Portion 3 | |
| t-butyl peroctoate (Elf Atochem North America, Inc., Philadelphia, PA) | 9.0 |
| ethyl acetate | 100.0 |
| Portion 4 | |
| p-nitrobenzoic acid (Aldrich Chemical Co., Milwaukee, WI) | 83.6 |
| N-benzylmethyl amine (Aldrich Chemical Co., Milwaukee, WI) | 5.46 |
| propylene carbonate | 202.1 |
| Portion 5 | |
| butyl acetate | 150.0 |
| Total | 1456.46 |

The Portion 1 mixture was charged into a 2 liter flask equipped as in Example 1. The mixture was heated to reflux temperature and refluxed for about 10 minutes. The Portion 2 and 3 were simultaneously added over 3 hours while the reaction mixture was held at reflux temperature. The reaction mixture was refluxed for another hour. Then Portion 4 was added. The reaction mixture was refluxed for 4 hours. After cooling, Portion 5 was added, and the polymer solution was filled out to yield a 57.3% polymer solution. This graft copolymer contains a copolymer of methyl acrylate, 2-hydroxyethyl acrylate, and glycidyl methacrylate (100% reacted with p-nitrobenzoic acid and N-benzylmethylamine) in the backbone and a random copolymer 2-ethylhexyl methacrylate and methyl methacrylate in the arms. The graft copolymer had a 24,979 Mw and a 9,104 Mn, and a Gardner-Holtz viscosity of W.

Comparative Example 1

This shows the preparation of a graft copolymer containing aliphatic amine and hydroxyl groups as pigment adsorption groups for comparative purposes, specifically methyl acrylate-co-2-hydroxyethyl acrylate-N,N-dimethylaminoethyl acrylate-g-butyl methacrylate-co-methyl methacrylate, 14/8/3//37.5/37.5% by weight, from a macromonomer prepared above and the following ingredients.

|  | Weight (gram) |
|---|---|
| Portion 1 | |
| macromonomer of Example 1 | 830.8 |
| ethyl acetate | 10.0 |
| Portion 2 | |
| methyl acrylate | 100.8 |
| N,N-dimethylaminoethyl acrylate | 21.6 |
| 2-hydroxyethyl acrylate | 57.6 |
| Portion 3 | |
| t-butyl peroctoate (Elf Atochem North America, Inc., Philadelphia, PA) | 9.0 |
| ethyl acetate | 90.0 |

-continued

| | Weight (gram) |
|---|---|
| Portion 4 | |
| propyleneglycol monomethyl ether acetate | 480.0 |
| Total | 1600.00 |

The procedure of Example 6 was repeated except the last step where the Portion 4 was added and the polymer solution was cooled and filled out. It yielded a light yellow clear 46.2% polymer solution. This graft copolymer contains a copolymer of methyl acrylate, 2-hydroxyethyl acrylate, and N,N-dimethylaminoethyl acrylate in the backbone and a random copolymer butyl methacrylate and methyl methacrylate in the arms. The graft copolymer had a Gardner-Holtz viscosity of 1.

Comparative Example 2

This shows the preparation of a graft copolymer containing hydroxyl groups as the only polar groups for comparative purposes, specifically methyl acrylate-co-2-hydroxyethyl acrylate-g-butyl methacrylate-co-methyl methacrylate, 17/8//37.5/37.5% by weight, from a macromonomer prepared above and the following ingredients.

| | Weight (gram) |
|---|---|
| Portion 1 | |
| macromonomer of Example 1 | 830.8 |
| ethyl acetate | 10.0 |
| Portion 2 | |
| methyl acrylate | 122.4 |
| 2-hydroxyethyl acrylate | 57.6 |
| Portion 3 | |
| t-butyl peroctoate (Elf Atochem North America, Inc., Philadelphia, PA) | 9.0 |
| ethyl acetate | 90.0 |
| Portion 4 | |
| propyleneglycol monomethyl ether acetate | 480.2 |
| Total | 1600.0 |

The procedure of Example 6 was repeated to yield a 49.1% clear polymer solution. This graft copolymer contains a copolymer of methyl acrylate, and 2-hydroxyethyl acrylate in the backbone and a random copolymer of butyl methacrylate and methyl methacrylate in the arms. The graft copolymer had a 52,927 Mw and 12,000 Mn and a Gardner-Holtz viscosity of M.

Example 12
Evaluation of Dispersant Properties

The dispersant effectiveness was determined by sand-grinding a mixture of pigment, solvent, and dispersant, and observing the dispersion quality under an Olympus microscope, 40X. The well dispersed system would have a uniform appearance and the pigment particles would show vigorous Brownian motion. In contrast, the flocculated systems would have islands of flocculated pigment chunks interspersed with areas of relatively clear solvent.

The dispersion samples were prepared by the following procedure. To a 2 oz glass bottle, 15 gm of sand, 20 gm of butyl acetate, 2 gm of pigment, and 1 gm of the graft copolymer dispersant solution were added. The bottle was sealed and agitated on a Red Devil paint shaker for 15 minutes.

Results

| Pigment | Ex. 6 | Ex. 7 | Ex. 8 | Ex. 9 | Ex. 10 | Ex. 11 | CEx 1 | CEx 2 |
|---|---|---|---|---|---|---|---|---|
| 1 | F | D | D | D | D | F | F | F |
| 2 | F | D | D | D | D | D | F | F |
| 3 | D | F | F | F | D | D | F | F |
| 4 | D | D | D | D | D | D | D | D |
| 5 | D | F | D | D | D | F | D | F |
| 6 | D | D | D | D | D | D | D | D |
| 7 | D | D | D | D | F | D | F | F |
| 8 | D | D | D | D | D | D | D | D |
| 9 | D | D | D | D | D | D | D | D |
| 10 | D | F | F | D | D | D | D | F |
| 11 | F | D | D | D | D | D | F | F |
| 12 | D | D | D | D | D | D | D | D |
| 13 | D | D | D | D | D | D | D | F |
| 14 | D | D | D | D | F | D | F | D |
| 15 | D | D | D | D | D | D | D | D |

D: Deflocculated or dispersed
F: Flocculated
1. Monastral Red YRT-759D (Ciba-Geigy Corp., Pigment Div., Newpot, DE)
2. Irgazin DDP Red BO (Ciba-Geigy Corp., Pigment Div., Newport, DE)
3. Raven 5000 carbon black (Columbian Chemicals Co., Atlanta, GA))
4. Titanium dioxide R706 (DuPont Co., Wilmington, DE)
5. Sunfast green 7 (Sun Chemical Corp., Cincinnati, OH))
6. Endurophthal blue BT-617D (Clariant Corp., Coventry, RI)
7. Irgazin blue ATC (Ciba-Geigy Corp., Pigment Div., Newport, DE)
8. Magenta RT-355D (Ciba-Geigy Corp., Pigment Div., Newport, DE)
9. Perylene maroon R-6436 (Bayer Corp., Pittsburgh, PA)
10. Sicotrans red (BASF Corp., Colorant Division, Mount Olive, NJ))
11. Hostaperm yellow H-3G (Clariant Corp., Coventry, RI)
12. Irgacolor yellow (Ciba-Geigy Corp., Pigment Div., Newport, DE)
13. Irgazin blue X-3367 (Ciba-Geigy Corp., Pigment Div., Newport, DE)
14. Violet RT-101D (Ciba-Geigy Corp., Pigment Div., Newport, DE)
15. Bayferrox 3920 (Bayer Corp., Pittsburgh, PA)

Based on these test results, the graft structure and the polar hydroxyl groups and aliphatic amine groups on the backbone has provided some dispersing power to the polymer as in the Comparative Examples. However, the ones with specific pigment anchoring groups of this invention are far more effective for a wide range of pigment types.

Various modifications, alterations, additions or substitutions of he components if the compositions of this invention will be apparent to those skilled in the art without departing from the spirit and scope of this invention. This invention is not limited by the illustrative embodiments set forth herein, but rather is defined by the following claims.

What is claimed is:

1. A composition suitable for use as a pigment dispersant, comprising a graft copolymer having a macromonomer grafted onto a polymer backbone, wherein the macromonomer and backbone are formed from polymerized ethylenically unsaturated monomers, and wherein the graft copolymer has attached to either the backbone or macromonomer, a pigment anchoring group selected from the group consisting of an aromatic ester, aromatic amine, and quaternary ammonium group, or mixtures thereof.

2. The composition of claim 1 wherein said graft copolymer is formed by a macromonomer approach.

3. The composition of claim 1 wherein said graft copolymer is formed from polymerized acrylic monomers.

4. The composition of claim 1 wherein said anchoring group is an aromatic ester group prepared by contact of an epoxy functional group on either the backbone or macromonomer with a substituted or unsubstituted aromatic carboxylic acid.

5. The composition of claim 1 wherein said anchoring group is an aromatic amine group prepared by contact of an epoxy functional group on either the backbone or macromonomer with a substituted or unsubstituted secondary aromatic amine.

6. The composition of claim 1 wherein the anchoring group is a quaternary ammonium group prepared by contact of a tertiary amine functional group on either the backbone or macromonomer with an alkylation agent.

7. The composition of claim 1 wherein said graft copolymer contains hydroxyl groups on either or both the backbone or macromonomer.

8. The composition of claim 1 wherein the pigment anchoring group comprises at least about 1% by weight of the graft copolymer.

9. The composition of claim 1 wherein the pigment anchoring group comprises up to about 30% by weight of the graft copolymer.

10. The composition of claim 1 wherein the anchoring group is located on the backbone.

11. The composition of claim 1 wherein the anchoring group is located on the macromonomer.

12. A graft copolymer composition suitable for use as a pigment dispersant, comprising about:

a) 10 to 90% by weight, based on the weight of the graft copolymer, of a polymer backbone formed from polymerized ethylenically unsaturated monomers;

b) 90 to 10% by weight, based on the weight of the graft copolymer, of a macromonomer formed from polymerized ethylenically unsaturated monomers grafted onto said backbone, wherein the graft copolymer contains at least about 1% by weight of a pendant pigment anchoring group selected from the group consisting of an aromatic ester, aromatic amine, and quaternary ammonium group, or mixtures thereof, attached to either the backbone or macromonomer.

13. The composition of claim 12 wherein the graft copolymer further contains up to about 30% by weight of hydroxyl functional groups on either or both the backbone or macromonomer.

14. The composition of claim 13 wherein the graft copolymer has a weight average molecular weight of at least 3000.

15. The composition of claim 14 wherein the graft copolymer formed from polymerized acrylic monomers.

16. A pigment dispersion comprising a pigment in an organic solvent dispersed by means of a composition of claim 1.

* * * * *